United States Patent [19]
Bennett

[11] Patent Number: 5,642,160
[45] Date of Patent: Jun. 24, 1997

[54] DIGITAL IMAGE CAPTURE SYSTEM FOR PHOTO IDENTIFICATION CARDS

[75] Inventor: Michael Joseph Bennett, Las Vegas, Nev.

[73] Assignee: Mikohn Gaming Corporation, Las Vegas, Nev.

[21] Appl. No.: 250,664

[22] Filed: May 27, 1994

[51] Int. Cl.$^6$ .................................................. H04N 7/18
[52] U.S. Cl. .......................... 348/156; 348/96; 382/115; 382/116; 382/117; 382/118; 235/380; 235/382
[58] Field of Search .................................. 348/96, 98, 150, 348/156; 235/380, 382; 382/115, 116, 117, 118; H04N 7/18

[56] References Cited

U.S. PATENT DOCUMENTS

| | | | |
|---|---|---|---|
| 3,564,132 | 2/1971 | Baker | 178/6.8 |
| 3,997,723 | 12/1976 | Sandin | 178/7.8 |
| 4,121,249 | 10/1978 | Lemelson | 348/96 |
| 4,734,567 | 3/1988 | Hansbauer | 235/482 |
| 4,794,583 | 12/1988 | Funabashi et al. | 369/75.2 |
| 4,805,222 | 2/1989 | Young et al. | 382/115 |
| 4,821,118 | 4/1989 | Lafreniere | 348/156 |
| 4,982,072 | 1/1991 | Takigami | 235/384 |
| 4,993,068 | 2/1991 | Piosenka et al. | 382/116 |
| 5,072,246 | 12/1991 | Thayer et al. | 354/78 |
| 5,075,769 | 12/1991 | Allen et al. | 348/156 |
| 5,199,081 | 3/1993 | Saito et al. | 382/116 |

FOREIGN PATENT DOCUMENTS

| | | | |
|---|---|---|---|
| 560574 | 9/1993 | European Pat. Off. | G07C 9/00 |

*Primary Examiner*—Howard W. Britton
*Assistant Examiner*—Vu Le
*Attorney, Agent, or Firm*—Dorr, Carson, Sloan & Birney, P.C.

[57] ABSTRACT

A digital image capture system for a photo identification card wherein a housing contains a video camera and a tray that selectively moves through a formed slot in the housing between a first fully inserted position within the housing and a second fully open position outside of the housing. The tray has a formed recess that receives an insert plate. The insert plate has a formed opening for holding a photo identification card of a person. Different insert plates could be utilized under the teachings of the present invention having different-sized formed openings for different-sized photo identification cards. The photo identification card is placed into the formed opening and then the tray is slid into the fully inserted position in the housing. A magnet in the housing firmly holds the tray in the fully inserted position and this fully inserted position is sensed by a micro-switch that becomes activated to turn on a pair of opposing lamps to fully illuminate the photo identification card in the tray. The camera captures a video image of the fully illuminated photo identification card and delivers it to a remote computer for storage in a captured image database. In the event the identification card does not carry a photo, a second video camera positioned remote from the housing is used to capture a likeness image of the owner of the card which is also stored in the computer.

11 Claims, 8 Drawing Sheets

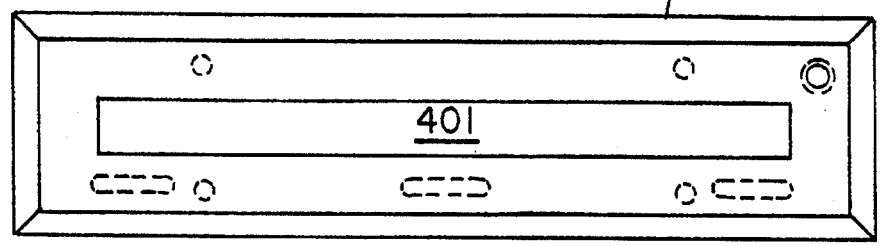
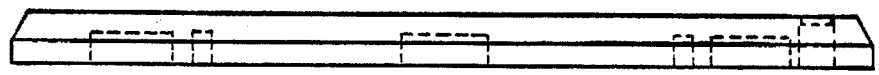
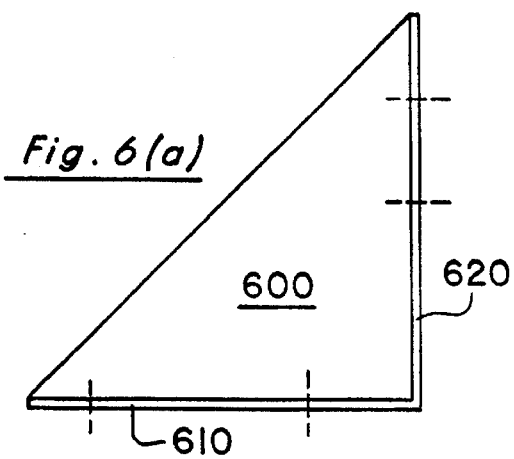
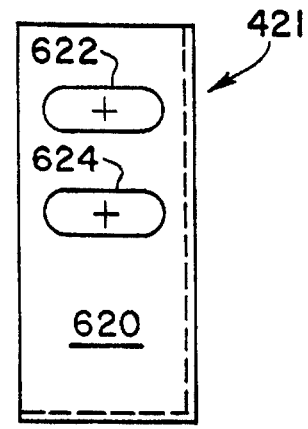
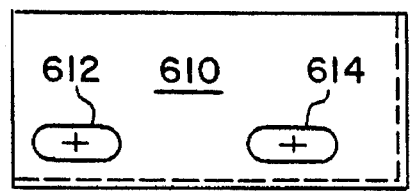

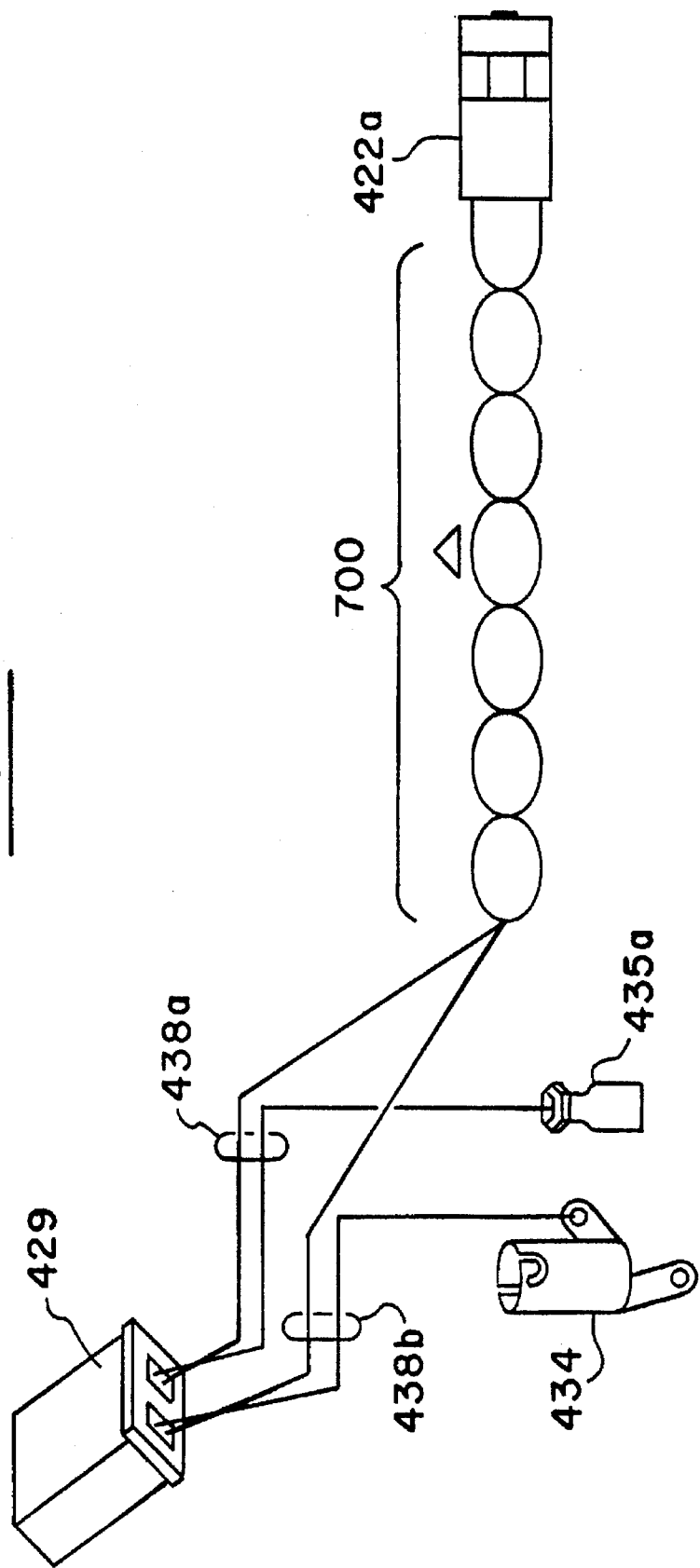

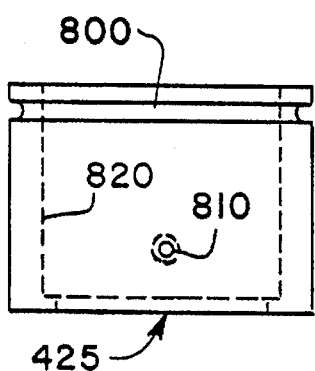
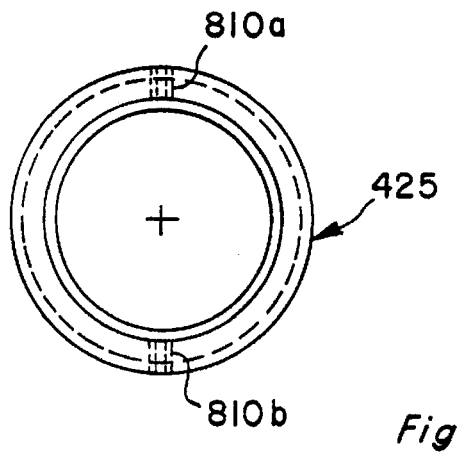
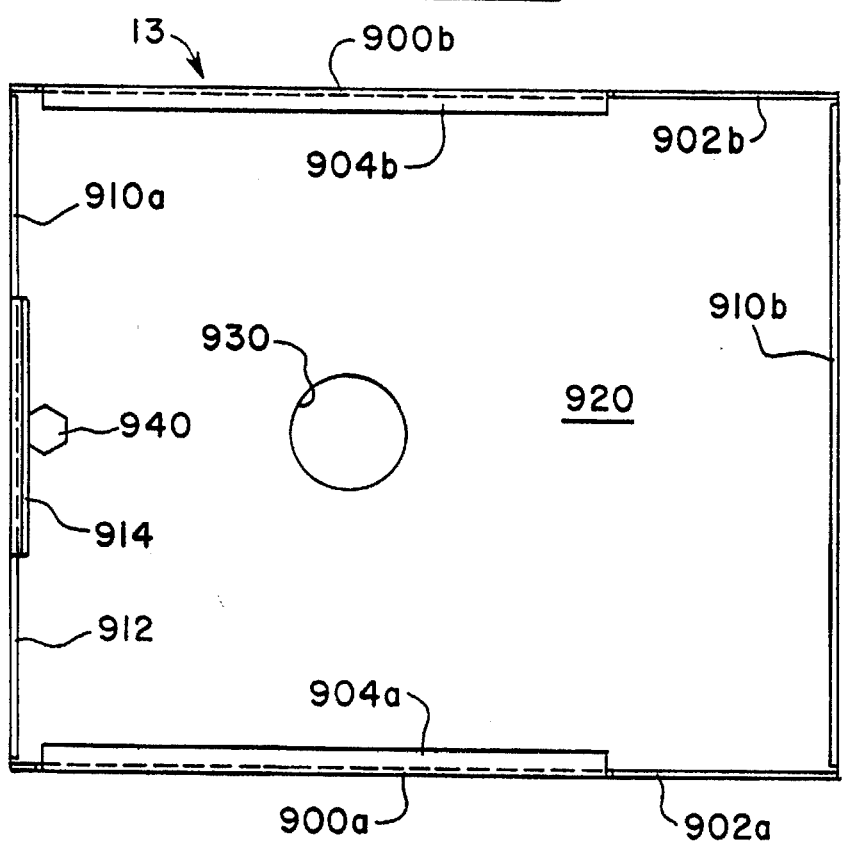
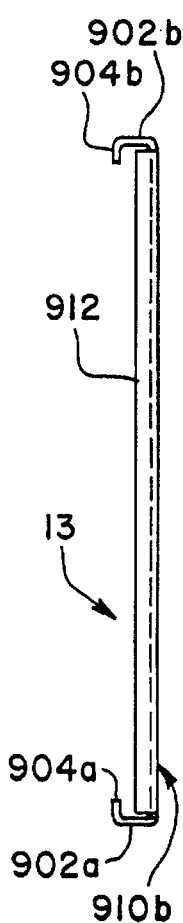
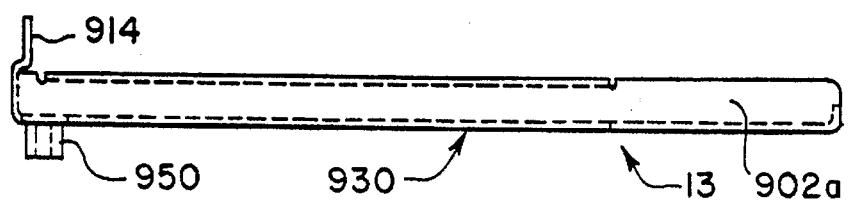

DIGITAL IMAGE CAPTURE SYSTEM FOR PHOTO IDENTIFICATION CARDS

BACKGROUND OF THE INVENTION

1. Field of the Invention

The present invention relates to a system for capturing a digital image and, more particularly, to a system for capturing digital images of photo identification cards such as driver's licenses, passports, and other similar identity cards and documents.

2. Statement of the Problem

A need exists in many businesses to capture and store in a database a high quality digital image of a photo identity card such as a driver's license or passport of an individual. For example, in the gaming and casino businesses, it is desirable to provide gaming managers and pit crews with an image on a computer monitor of a player involved in a particular game. This provides immediate customer identification, signature verification, and other personal information.

In some situations, a need exists for generating an individual's likeness in a captured likeness image since the identification card may not carry a photo.

3. Solution to the Problem

The present invention provides a solution to the needs set forth above by providing a digital image capture system for photo identification cards such as a drivers license or identity card typically bearing the photo and signature of an individual and storing a high quality digital image of the card. The system must be secure and prevent others from making copies of the card. Rather, only digital images of the card will be displayed for users of the system to verify identity, signature, and other personal information. The card can include any credit card-sized drivers license, credit card, identity card, or other document such as a passport. The present invention also generates and stores a captured digital likeness image of a person when the person's card does not have a photo on it.

SUMMARY OF THE INVENTION

A digital image capture system for a photo identification card is disclosed wherein a housing contains a video camera and a tray that selectively moves through a formed slot in the housing between a first fully inserted position within the housing and a second fully open position outside of the housing. The tray of the present invention has a formed recess that receives an insert plate. The insert plate has a formed opening for holding a photo identification card of a person. Different insert plates could be utilized under the teachings of the present invention having different-sized formed openings for different-sized photo identification cards. The photo identification card is placed into the formed opening and then the tray is slid into the fully inserted position in the housing. A magnet in the housing firmly holds the tray in the fully inserted position and this fully inserted position is sensed by a micro-switch that becomes activated to turn on a pair of opposing lamps to fully illuminate the photo identification card in the tray. Fully illuminated, the camera captures a video image of the photo identification card and delivers it to a remote computer for storage in a captured image database.

In the event the identification card does not carry a photo, a second video camera positioned remote from the housing is used to capture a likeness image of the owner of the card which is also stored in the computer.

BRIEF DESCRIPTION OF THE DRAWINGS

FIGS. 5(a)–(c) set forth the details of the bezel of the present invention.

FIGS. 6(a)–(c) set forth the details of the bracket for holding the camera contained within the housing of the present invention.

FIG. 7 sets forth the details of the power wire assembly of the present invention.

FIGS. 8(a)–(b) set forth the details of the collar for adjusting the focus of the camera.

FIGS. 9(a)–(c) set forth the details of the slide tray of the present invention.

DETAILED SPECIFICATION

1. Overview

Figure 1:
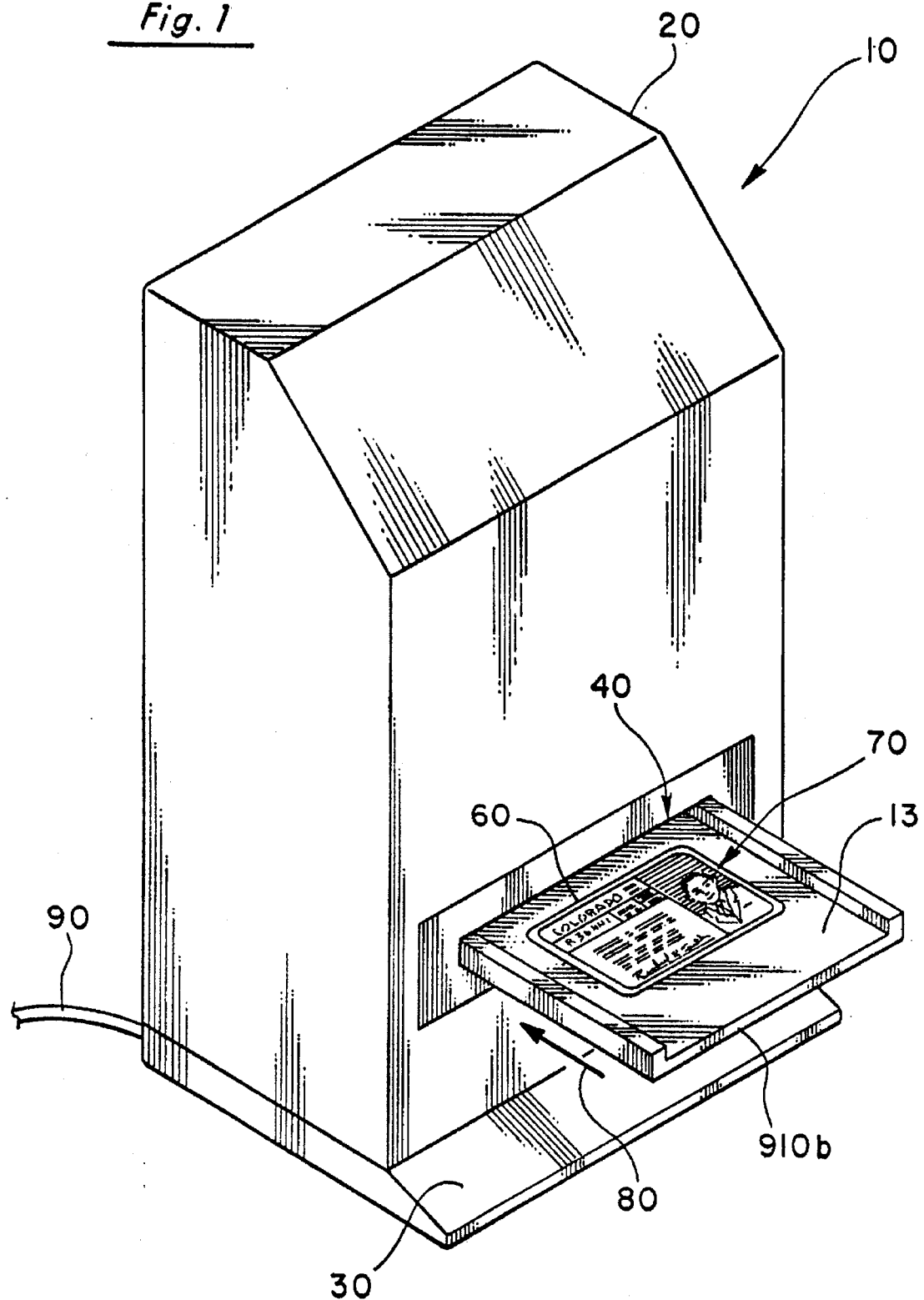
FIG. 1 is a perspective view of the digital image capture housing of the present invention.

In FIG. 1, an illustration setting forth the general components of the digital image capture device 10 of the present invention is shown. The device 10 includes a housing 20, a support base 30, a formed slot 40, a sliding tray 13, and a recess 60 for holding a card 70. Throughout this specification, the term "card" refers to a driver's license, a bank card, an ID card, a passport, or to any document that contains a photo or information.

In operation, the user of the present invention places card 70 into recess 60 and then slides the tray 13 in the direction of arrow 80 into slot 40 into a first fully inserted position. A digital image is then taken of the card 70 by a video camera stored within the housing 20. Upon completion of the capturing process, the tray 13 is slid in a direction opposite that of arrow 80 into a second fully opened position and the card 70 is removed.

It is to be expressly understood that card 70 can be flipped over and replaced into the recess 60 so that the obverse side of the card can also have its video image captured.

Figure 2:
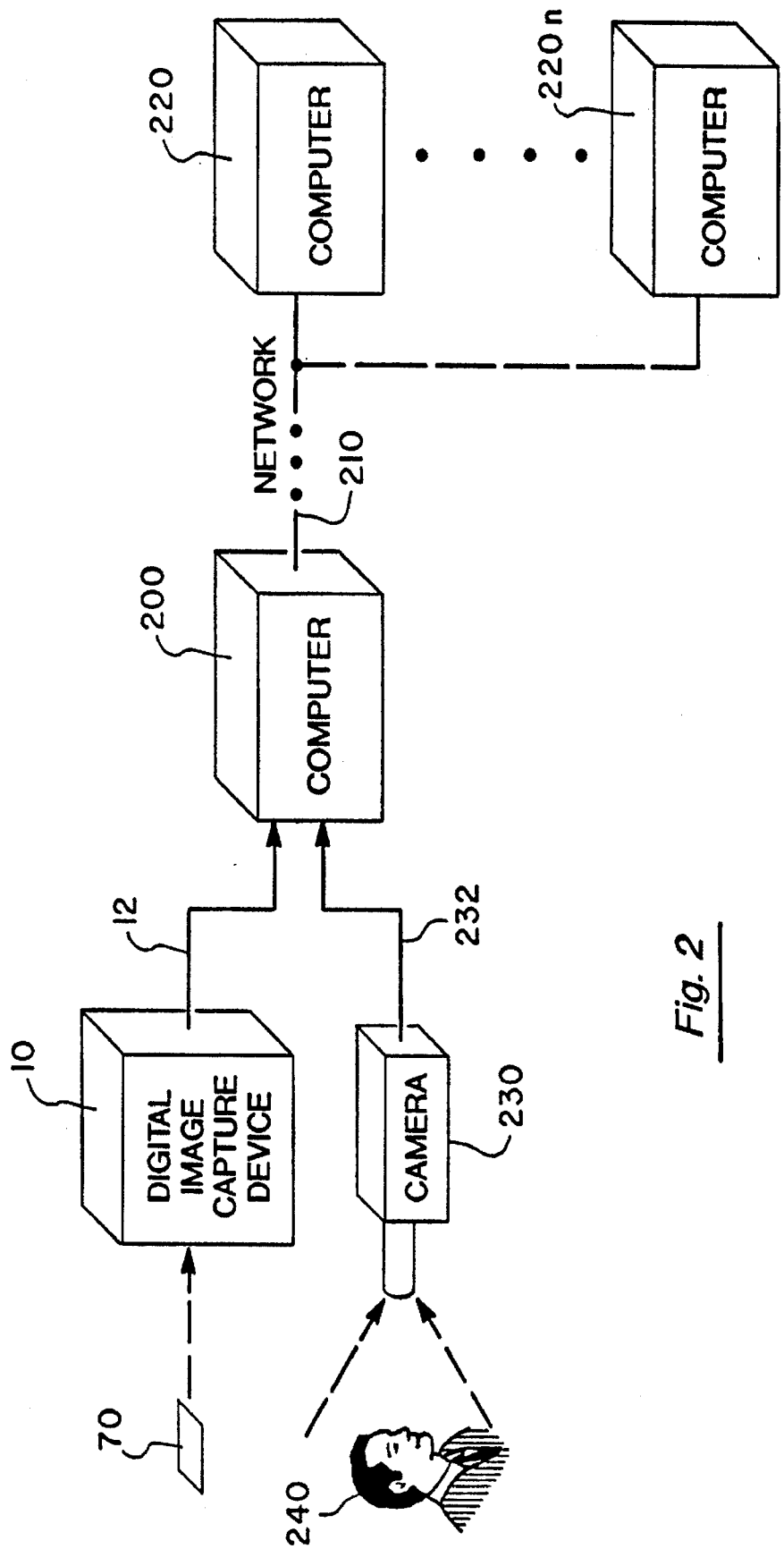
FIG. 2 is a block diagram showing the present invention in the environment of a computer network.

It is also to be expressly understood that while the housing 20 and the base 30 are of a preferred design, any suitable design could be utilized. Likewise, the provision of a base 30 is optional under the teachings of the present invention. Finally, the slot 40 and the tray 13 can be located in any suitable orientation or position in the housing 20, A cable 12 interconnects to the interior of the housing 20 that enables the captured video image to be delivered out from the device 10 to a remote location. The digital image capture device 10 can be used in a system environment as shown in FIG. 2. In this environment, the device 10 is interconnected over lines 12 to a computer 200 such as a standard personal computer operating, for example, at 66 MHz. The computer 200 has a monitor, keyboard, and other standard and conventional components. The computer 200 is interconnected over a network 210 to other computers 220.

The network 210 can be any suitable network such as a Novell Network. Each computer 220, like computer 200, is a standard conventional personal computer.

Also interconnected to computer 200 is a second video camera 230 that is interconnected over lines 232 to computer 200. Camera 230 is an option under the teachings of the present invention, but serves an important function. In the event that the card 70 does not carry the owner's photograph, camera 230 captures the owner's likeness 240. The camera 230 may be preset so no focusing or adjusting by the operator is required. Furthermore, the computer 200 is designed so that only single keystroke commands on the keyboard are used to control the computer program interface.

In operation, the system shown in FIG. 2 functions as follows. The card 70 is inputted into the digital image capture device 10 to capture a digital image of the card 70. The digital image is then delivered over lines 12 to the computer 200 for storage. Likewise, if a digital photo of the person 240 who owns the card 70 is also required, that image is captured by camera 230 and delivered over lines 232 to computer 200 for storage. Operators of computers 220 at remote locations such as managers in the casino can then type in the person's name and instantly view a digital image of card 70 and/or a digital likeness of the person 240 as retrieved by camera 230. The manager or other person can then verify the individual's identity and any associated signatures or other information.

Figure 3:
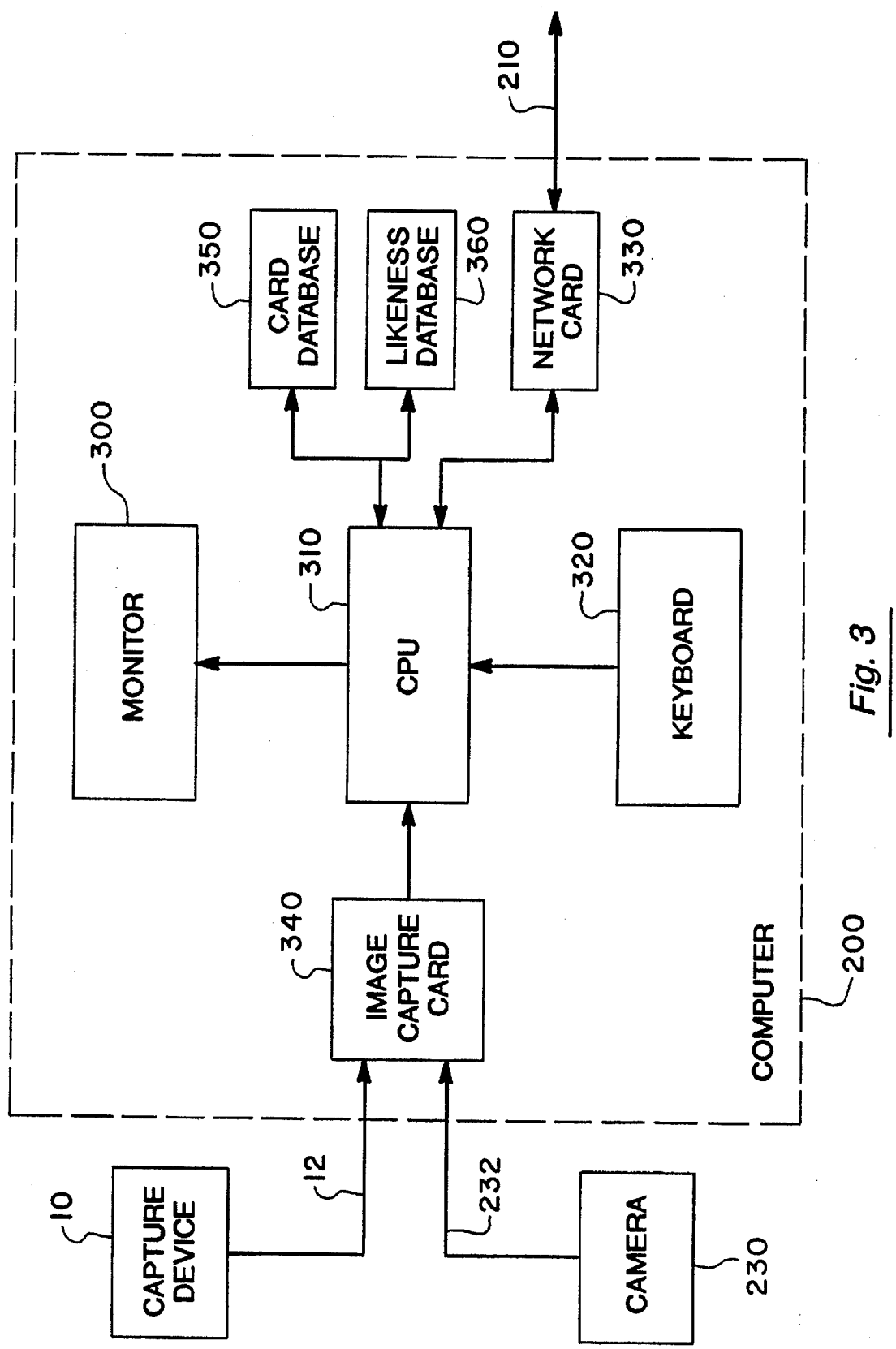
FIG. 3 sets forth in block diagram format the components of the digital image capture system of the present invention.

The details of the computer 200 are shown in FIG. 3. The computer 200 includes a conventional monitor 300 driven by a CPU 310. The CPU 310 receives input commands from a mouse, a keyboard 320, or the like. The CPU 310 is interconnected to the network 210 through a standard network card 330. The CPU 310 is also interconnected to a standard image capture card 340 that is connected to lines 12 (to the capture device 10) and to lines 232 (to the camera 230).

The CPU 310 builds a card database 350 based on the images captured by device 10. The CPU 310 may optionally build a likeness database 360 based on the likeness images from camera 230.

2. Details of Image Capture Device 10

Figure 4:
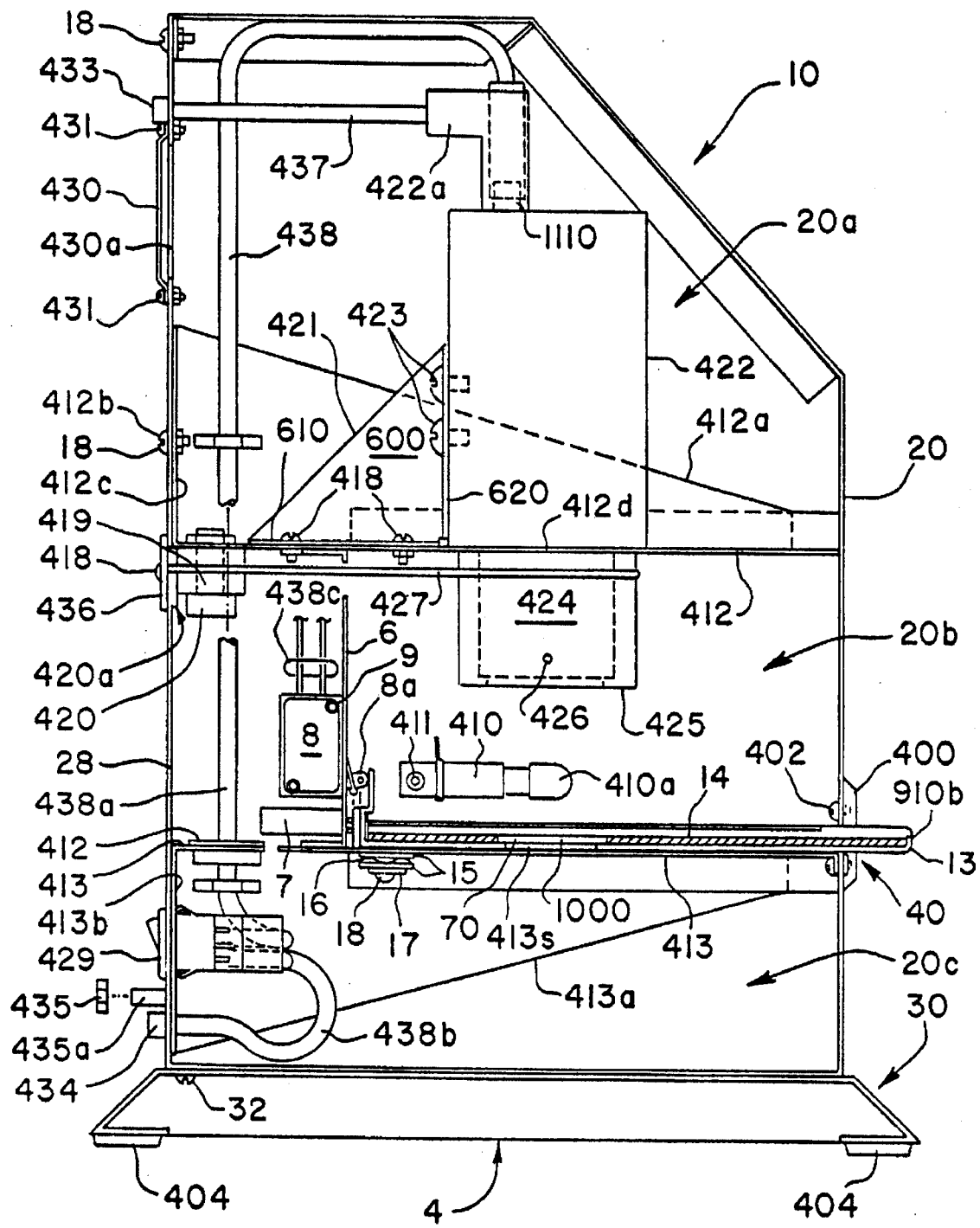
FIG. 4 is an illustration setting forth the various components contained within the housing of the digital image capture device of the present invention as shown in FIG. 1.

In FIG. 4, the details of the image capture device 10 of the present invention are set forth. The device 10 has a housing or chassis cover 20. In the preferred embodiment, the cover 20 is composed of metal preformed in the shape shown in FIGS. I and 4. Mounted on the exterior of the housing 20 is a document drawer bezel 400 containing slot 40. The details of the bezel 400 are shown in FIG. 5, which more clearly illustrates the slot 40. In the preferred embodiment, the bezel is rectangular and is made from plastic or nylon material. As shown in FIG. 5, the slot 40 is also rectangular, having a preferred dimension of about 0.4"×5.2". It is to be expressly understood that any suitable design or shape for the bezel 400 of the present invention could be utilized. The bezel 400 is mounted to the housing 20 by means of screws 402.

At the bottom of the housing 20 is mounted the base 30, which is connected to the housing by means of screws 32 (only one of which is shown in FIG. 4). Rubber feet 404 are mounted on the base 30.

Mounted within the housing 20 is a miniature conventional color CCD camera 422. The camera 422 is mounted to a camera mounting bracket 421 by means of camera mounting screws 423.

The details of the camera mounting bracket 421 are shown in FIG. 6. In FIG. 6, the camera mounting bracket 421 is triangular as shown in FIG. 6(a) having three walls 600, 610, and 620. The use of the triangular shape and three walls 600, 610, and 620 provides a very rigid support structure for the camera 422. As shown in FIG. 6(b), wall 610 has slots 612 and 614 formed therein, and as shown in FIG. 6(c), wall 620 has slots 622 and 624 formed therein. Slots 622 and 624 are receptive of camera mounting screws 423 as shown in FIG. 4. Slots 612 and 614 in wall 610 are receptive of screws 418 as shown in FIG. 4 for mounting the wall 610 to support plate 412, which crosses through housing 20.

As shown in FIG. 4, the camera 422 is rigidly mounted to bracket 421, which in turn is rigidly mounted to housing 20 by means of plate 412. A video cable 437 interconnects to a connector 422(a) in a conventional fashion to camera 422. The video cable 437 connects to a video output jack 433 on the exterior of the housing 20. In reference back to FIGS. 2 and 3, cable 12 interconnects with jack 433 to deliver the video signals out from the housing 20. Camera 422 receives DC power over power cable 438, which is interconnected to a power jack 434 also located on the exterior of the housing 20. The power jack 434 is conventionally interconnected to a 12-volt DC power support source (not shown) by power cable 90 (shown in FIG. 1). A ground terminal locking nut 435 engages a corresponding threaded stud 435(a) so that a ground cable can be connected to ground the housing 20 in a conventional fashion. A conventional on/off rocker switch 429 serially interrupts power in the cable 438 to enable the operator of the device 10 of the present invention to turn power on and off to the camera 422. Power cable 438 is delivered through a grommet 412. Grommet 412 encircles a formed hole in a mounting plate 413, extending across the housing 20 as shown in FIG. 4.

Before proceeding with the remaining technical discussion, it can be readily observed that the camera 422 is rigidly mounted in the interior of the housing 20 and selectively receives power from a DC source external of the housing 20 and delivers captured video image signals out from the housing 20. It is to be expressly understood that the position and orientation of the camera 422, cable 437, and cable 438 are a matter of design choice and that any suitable orientation or location can also be utilized under the teachings of the present invention.

Because the camera 422 generates heat, a vent or grill 430 is provided for a formed opening 430(a) in the housing 20. This provides ventilation to the interior of the housing 20. The grill 430 is conventionally mounted by screws 431.

The details of the power wire assembly are shown in FIG. 7. The wiring is conventional. However, the wiring 438(a) should be twisted a minimum of one turn per inch as illustrated in FIG. 7 at region 700.

Plate 412 is also triangular as witnessed by edge 412(a). Plate 412 defines a compartment 20(a) in which is contained the camera 422. Plate 412 is affixed to the housing 20 by means of a screws 412(b). Plate 413 also has a triangular edge 413(a) and a rear plate portion 413(b). Plate 413 is also affixed to the housing 20 by means of a screw, not shown. Plate 413 defines two compartments 20(b) and 20(c). Plate 412 has a formed opening 412(d) through which the lens 424 of the camera 422 extends.

A camera lens focus cylinder or collar 425 surrounds the lens 424. FIG. 8 sets forth the collar 425. The collar 425 is cylindrical and at one end has a formed annular region 800 that forms an adjustment tack. A formed hole 810 is drilled into the side of the collar 425. The hole 810 is shown in FIG. 8(b) and extends through both sides of the collar. A set screw 426 as shown in FIG. 4 is used in each hole 810 to firmly attach the collar to the lens 424. In the preferred embodiment, the collar 425 is made from plastic or nylon material. The interior 820 of the collar is configured to conform substantially with the outer shape of the lens 424. A camera focus adjustment belt 427 engages tack 800 in collar 425. This is shown in FIG. 4. The camera focus adjustment belt 427 engages a rubber thumb wheel 419 that is mounted by a shoulder screw 420 to plate 412. The housing 20 has a formed opening 420(a) that provides access to the rubber thumb wheel 419. A focus adjustment cover plate 436 is affixed by means of a screw 418 to the housing 20. When the cover plate 436 is removed, by removing screw 418, the thumb wheel 419 can be selectively moved, which causes belt 427 to correspondingly move collar 425 to adjust the focus of the lens 424 of the camera 422. The cover plate 436 when affixed to the housing 20 is designed to be a tight flush engagement so as to prevent light from entering enclosed region 20(b).

In summary, it is to be expressly understood that a particular design has been presented for enabling the lens 424 of the camera 422 to be selectively adjusted by the operator of the device 10 of the present invention. Adjustment can be easily accomplished with reference to FIGS. 2 and 3 by viewing in the monitor 300 of computer 200 a test image of card 70 in order to place it in clear focus. Once the camera 422 is focused, the cover plate 436 can be affixed so as to prevent light from entering region 20(b).

The document drawer or slide tray 13 is selectively operating on plate 413.

The details of the document drawer 13 are set forth in FIG. 19. As shown in FIG. 9(a), the tray 13 is rectangular with sides 900 being longer than ends 910. The front 910b of the tray 13, as shown in FIG. 1, extends outwardly from the housing 20. The front edge 910b, as shown in FIG. 9(b), has an upstanding lip 912. The sides 900 of tray 13 also have an upstanding lip 902. As shown in FIG. 9(a), each upstanding lip 902 has an inwardly directed flange 904. This is best illustrated in FIG. 9(b). The bottom 920 of the tray 13 has a formed hole 930.

The rear 910a of the tray 13 also has a raised upstanding lip 912, and as shown in FIG. 9(c), the central portion of lip 912 has an upwardly extending portion 914. Near the rear 910a and centrally located in the bottom 920 is a second formed hole 940 to which is affixed a connector 950 as shown in FIG. 9(c).

Figure 10:
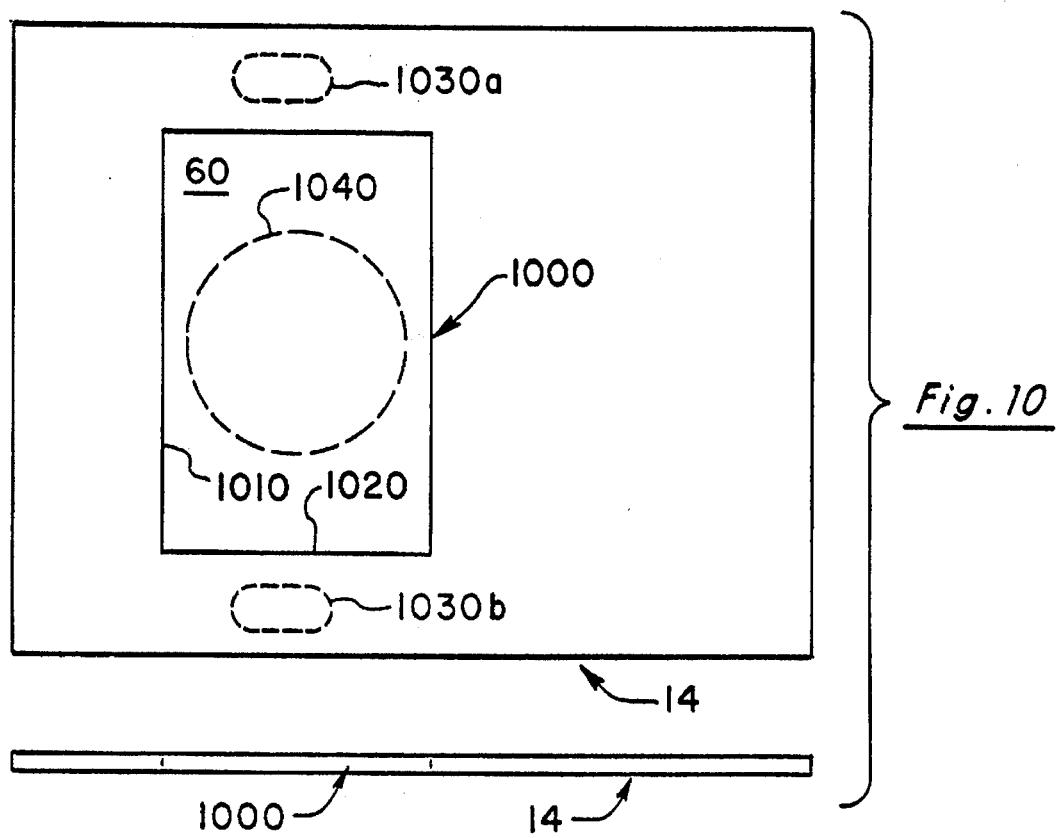
FIG. 10 sets forth the details of the tray insert of the present invention.

In the bottom 920 of the tray 13 is placed a plastic document alignment insert 14 as shown in FIG. 4. The details of insert 14 are shown in FIG. 10. In FIG. 10, the plastic insert 14 is rectangular and has a formed rectangular hole 1000 as illustrated. The hole 1000 is configured to be slightly larger than a standard credit card, and in the preferred embodiment the dimensions are about 3.4 inches for side 1010 and about 2.2 inches for side 1020. This dimension accommodates most conventional cards. However, it is to be expressly understood that this insert can be designed to accommodate any type of card or document of any suitable size. In fact, the operator of the device 10 of the present invention can have a number of different inserts 14 to accommodate different sized documents. Each insert 14 can be quickly inserted into the tray 13 as shown in FIG. 9 underneath the flanges 904 and quickly removed by using the finger of the operator to push up on the insert through formed hole 930. As shown in FIG. 4, the thickness of the insert 14 is about half the height of the lips 902 for the tray 13. The tray 13 is slidably mounted to plate 413 by means of a slide washer 15, a spring washer 16, and a spacer washer 17, all of which are held in place by means of screw 18 to connector 950 on the bottom 920 of the tray 13. The slot in which connector 950 slides is shown in FIG. 4 as 413s. Hence, in operation, by pulling on end 910b of the tray in a direction away from housing 20, the tray 13 travels outwardly with connector 950 sliding in slot 413s. It is to be expressly understood that any of a number of suitable designs for mounting the tray 13 to the interior of the housing 20 could be utilized under the teachings of the present invention.

Mounted at the rear of the tray when fully inserted into the housing 20 is a document drawer-actuated light switch 8. The light switch 8 is conventionally mounted by screw 9 to the rear wall 6. The micro-switch 8 has a sensor 8a that extends through the wall 6 to abut against extension 914 of the tray 13. Hence, when the tray 13 is fully inserted into the housing 20, extension 914 abuts against sensor 8a to place the micro-switch 8 in an activated position. When the tray 13 is slightly moved outwardly, the extension 914 does not abut against the sensor 8a and the micro-switch 8 is in the off position.

Below the micro-switch 8 is a document drawer hold magnet 7 that is selectively used to hold the tray 13 in the fully inserted position. This is important to provide a stable environment wherein the extension 914 fully engages the sensor 8a of the micro-switch 8. Magnet 7 also firmly holding the drawer 13 also ensures full insertion and minimizes any vibration of the tray while the image is being captured.

In the housing 20 are two light bulb bayonet mounts 410 that are selectively mounted to the housing 20 by means of a mounting screw 411. Each mount 410 contains a light 410a. The mounts 410 are mounted on directly opposing walls of the housing 20 on opposite sides of the insert 14 of FIG. 10. The general locations of the bulbs 410a are shown by dotted lines 1030 in FIG. 10 with respect to the formed opening 1000. With this orientation, the card placed within formed opening 1000 is fully illuminated and the entire image of the card is delivered through the lens (shown by dotted lines 1040 in FIG. 10) of the camera 422. It is to be expressly understood that the dotted lines shown in FIG. 10 are for purposes of illustration to show general locations of the bulbs 1030 and the lens 1040 when the tray carrying the insert 14 is fully inserted into the housing 20.

Figure 11:
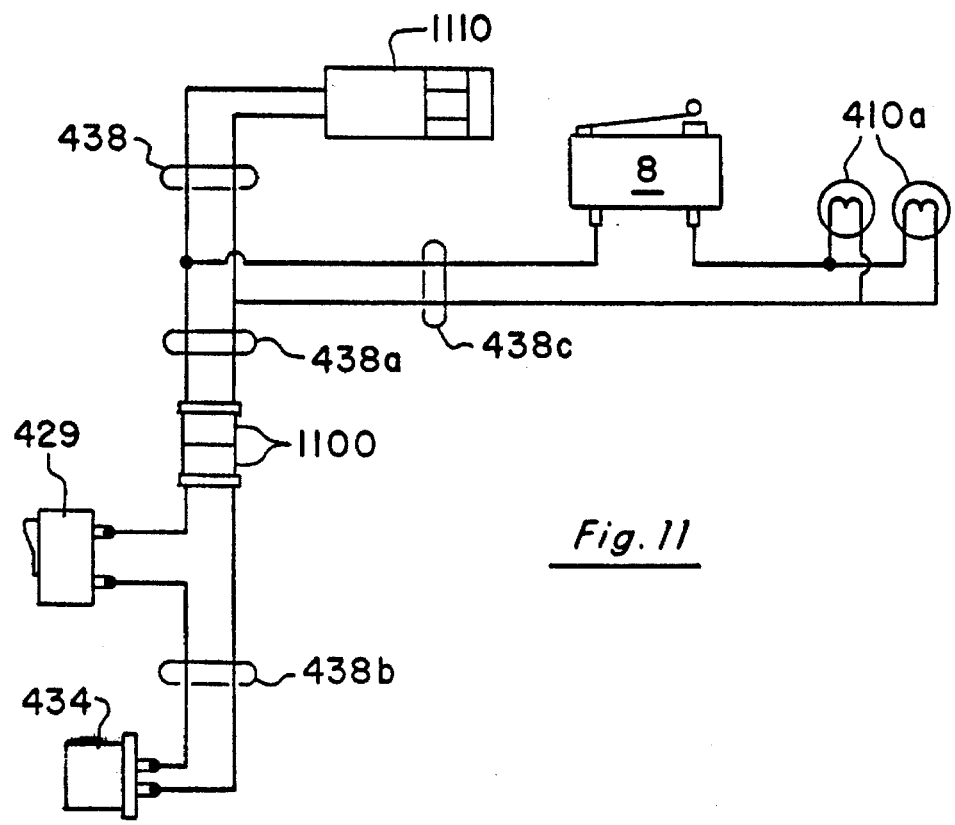
FIG. 11 sets forth the wiring diagram for the housing of the present invention.

In FIG. 11, the wiring diagram of the present invention is set forth. The power connector 434 delivers the DC power into cable 438b, which is connected to rocker switch 429. The DC power is then delivered through connectors 1100 to cable 438, which delivers DC power through connector 1110 to the video camera 422, and through cable 438c to the micro-switch 8 and then to the lights 410a. The wiring diagram of FIG. 11 is conventional in design.

3. Summary

Region 20b of the digital image capture device 10 of the present invention serves as a light box in which the card receives proper lighting from lights 410a. The miniature color CCD camera 422 and its lens 424 are used to photographically capture an image of the desired card. All of the remaining components in housing 20 facilitate an automated process of digital image capturing of the card.

The operation occurs as follows. In FIGS. 1 and 2, the desired card 70 is placed in the plastic document alignment insert 14, which is, in turn, held in place by the document drawer or tray 13. The document tray 13 slides freely in slot 413s, which is centered and located just below the tray 13 as shown in FIG. 4. Once the tray 13 is inserted, magnet 7 holds the tray in a fully inserted position to ensure that the light switch 8 remains actuated for the duration of the image capturing process.

In order to properly illuminate the document 70, two incandescent lamps 410a are placed at precise angles adjacent to and on each side of the document viewing area 1000 that contains the card 70. Power to the lamps 410a is controlled by light switch 8. The lamps 410a are switched on and off to save power, to prevent heat buildup, and to provide the operator of the device 10 with a visual indication that the drawer is fully seated. Lighting of the document viewing area 1000 is also enhanced by providing a light or white color to all inner surfaces of region 20b. The document viewing area refers to the area as seen through the lens 424 of the camera 422.

A focusing mechanism is provided by the rubber thumb wheel 419, the focus adjustment belt 427, and the camera lens focus adjustment cylinder 425. This externally accessible adjustment is used to fine tune the lens focus after the unit has been shipped or if some other event occurs that can inadvertently change the focus adjustment.

Power to the lamps 410a and to the CCD color camera 422 is provided by an external, regulated, 12-volt DC power supply preferably rated at 2.5 amps. It is connected through the power jack 434, and as set forth in FIG. 11, is wired to the lamps, the light switch, and the camera. The video signal from the camera is fed through a shielded cable 437 to the rear of the housing 20. Jack 433 is used to connect the video signal from the camera to the host computer 200 and specifically to the digital image capture interface board 340 as shown in FIG. 3. The chassis base 30 is used to stabilize the device 10 while providing aesthetic appeal and a firm mounting base.

While the present invention has been described in a preferred embodiment, it is to be understood that modifications to the design could be made by those skilled in the art without departing from the teachings of the invention as set forth in the following claims.

I claim:

1. A digital image capture system for a photo identification card, said system comprising:

a housing having a light box region from which light is excluded, said housing having a formed slot in said light box region, a digital video camera having a lens, said lens located within said light box region above and substantially perpendicular to said formed slot, said digital video camera located outside of said light box region, a tray operatively connected to said housing for moving through said formed slot between a first fully inserted position within said housing and a second fully open position outside of said housing, said tray filling said slot thereby excluding ambient light from said light box region when said tray is in said fully inserted position, said tray having a formed recess, at least one insert plate for selectively engaging said formed recess of said tray, said at least one insert plate having a formed opening for holding said photo identification card when said photo identification card is inserted into said formed opening and when said tray is in said second fully open position, wherein the configuration of said formed opening is slightly larger than the configuration of said photo identification card, means in said housing for maintaining said tray in said first fully inserted position, illumination means in said light box region for illuminating said photo identification card when said tray is in said first fully inserted position, and means in said housing sensing when said tray is in said first fully inserted position for activating said illumination means and said digital video camera, wherein when said tray is in said first fully inserted position, said lens is positioned above said photo identification card held by said formed opening in said insert plate, said photo identification card is illuminated by said illumination means, and said digital video camera captures through said lens a digital image of said photo identification card.

2. The system of claim 1 wherein said maintaining means is a magnet.

3. The system of claim 1 wherein said illumination means is a pair of lamps located on opposing sides of and above said formed opening in said insert plate.

4. The system of claim 1 wherein said activating means is a micro-switch.

5. The system of claim 1 further comprising means connected to said camera for adjusting the focus of said camera.

6. A digital image capture system for an identification card, said system comprising:

a computer, said computer having a captured image database, a housing having a light box region from which light is excluded, said housing having a formed slot in said light box region, a digital video camera having a lens, said lens located within said light box region above and substantially perpendicular to said formed slot, said digital video camera connected to said computer, said digital video camera located outside of said light box region, a tray operatively connected to said housing for moving through said formed slot between a first fully inserted position within said housing and a second fully open position outside of said housing, said tray filling said slot thereby excluding ambient light from said light box region when said tray is in said fully inserted position, said tray having a formed recess, one or a plurality of insert plates for selectively engaging said formed recess of said tray, each said insert plate having a formed opening for holding said identification card when said identification card is inserted into said formed opening and when said tray is in said second fully open position wherein the configuration of said formed opening is slightly larger than the configuration of said photo identification card, at least one lamp in said light box region for illuminating said photo identification card when said tray is in said first fully inserted position, and means in said housing sensing when said tray is in said first fully inserted position for activating said at least one lamp and said digital video camera, wherein when said tray is in said first fully inserted position, said lens is positioned above said photo identification card held by said formed opening in said insert plate, said photo identification card is illuminated by said illumination means, said digital video camera captures through said lens a digital image of said photo identification card, and said computer stores said digital image of said identification card in said captured image database.

7. The system of claim 6 wherein said computer has a captured likeness database and wherein said system further comprises a second video camera connected to said computer and positioned remote from said housing, said second video camera capturing a digital image of the likeness of the owner of said identification card, said computer receptive of said digital image of said likeness from said second video camera for storing said digital image in said captured likeness database.

8. The system of claim 6 wherein said activating means is a micro-switch.

9. The system of claim 6 further comprising means connected to said camera for adjusting the focus of said camera.

10. A digital image capture system for an identification card, said system comprising:

- a computer, said computer having a captured image database and a captured likeness database,
- a housing having a light box region from which light is excluded, said housing having a formed slot in said light box region,
- a digital video camera having a lens, said lens located within said light box region above and substantially perpendicular to said formed slot, said digital video camera connected to said computer, said digital video camera located outside of said light box region,
- a tray operatively connected to said housing for moving through said formed slot between a first fully inserted position within said housing and a second fully open position outside of said housing, said tray filling said slot thereby excluding ambient light from said light box region when said tray is in said fully inserted position, said tray having at least one formed opening for holding said identification card when said identification card is inserted into said formed opening when said tray is in said second fully open position, wherein the configuration of said formed opening is slightly larger than the configuration of said photo identification card,
- at least one lamp in said light box region for illuminating said photo identification card when said tray is in said first fully inserted position,
- means in said housing sensing when said tray is in said first fully inserted position for activating said at least one lamp and said digital video camera, wherein when said tray is in said first fully inserted position, said lens is positioned above said photo identification card held by said formed opening, said photo identification card is illuminated by said illumination means, said digital video camera captures through said lens a digital image of said photo identification card, and said computer stores said digital image of said identification card in said captured image database, and
- a second video camera connected to said computer and positioned remote from said housing, said second video camera capturing a digital image of the likeness of the owner of said identification card, said computer receptive of said digital image of said likeness from said second video camera for storing said digital image in said captured likeness database.

11. A digital image capture system for an identification card, said system comprising:

- a computer, said computer having a captured image database,
- a housing having a light box region from which light is excluded, said housing having a formed slot in said light box region,
- a digital video camera having a lens,
- a tray operatively connected to said housing for moving through said formed slot between a first fully inserted position within said housing and a second fully open position outside of said housing, said tray filling said slot thereby excluding ambient light from said light box region when said tray is in said fully inserted position, said tray having at least one formed recess for holding said identification card when said identification card is inserted into said tray when said tray is in said second fully open position, wherein the configuration of said formed opening is slightly larger than the configuration of said photo identification card,
- at least one lamp in said light box region for illuminating said photo identification card when said tray is in said first fully inserted position, and
- means in said housing sensing when said tray is in said first fully inserted position for activating said at least one lamp and said digital video camera, wherein when said tray is in said first fully inserted position, said lens is positioned above said photo identification card held by said tray, said photo identification card is illuminated by said illumination means, said digital video camera captures through said lens a digital image of said photo identification card, and said computer stores said digital image of said identification card in said captured image database.

* * * * *